United States Patent [19]

Matsuura et al.

[11] Patent Number: 4,494,298
[45] Date of Patent: Jan. 22, 1985

[54] AUTOMATIC ASSEMBLING APPARATUS

[75] Inventors: Tamiaki Matsuura; Takeshi Aiba; Takashi Fukushima; Masanori Nishimura; Hiroshi Ohtsuki, all of Kanagawa; Fujio Yabuki, Saitama; Tomio Kusakabe, Chiba, all of Japan

[73] Assignee: Sony Corporation, Tokyo, Japan

[21] Appl. No.: 380,997

[22] Filed: May 21, 1982

[30] Foreign Application Priority Data

May 23, 1981 [JP] Japan .................... 56-78335

[51] Int. Cl.$^3$ .................... B23Q 7/04; B23B 13/00
[52] U.S. Cl. .................... 29/563; 29/564; 198/340; 198/351
[58] Field of Search .................... 29/563, 564, 564.1, 29/564.4, 564.6; 414/279; 198/339, 340, 351, 485; 82/2.5

[56] References Cited

U.S. PATENT DOCUMENTS

| 3,572,520 | 3/1971 | Evans et al. | 198/339 |
| 3,648,819 | 3/1972 | Converse et al. | 198/340 X |
| 3,909,922 | 10/1975 | Takasaki | 29/563 |
| 4,097,984 | 7/1978 | Pelrov | 29/563 |

FOREIGN PATENT DOCUMENTS

| 863724 | 2/1971 | Canada | 198/339 |
| 106756 | 8/1980 | Japan | 198/339 |
| 145019 | 11/1981 | Japan | 198/340 |
| 2101065 | 1/1983 | United Kingdom | 198/351 |
| 753573 | 8/1980 | U.S.S.R. | 29/564 |
| 810584 | 4/1981 | U.S.S.R. | 198/340 |

Primary Examiner—William R. Briggs
Attorney, Agent, or Firm—Lewis H. Eslinger; Alvin Sinderbrand

[57] ABSTRACT

An automatic assembling apparatus includes a pair of parallel conveyers for transferring carriers, each carrier having four chassis and parts to be assembled on the chassis; a plurality of assembly stations, each having a movable table on which various assembling operations can be performed with respect to the carriers; a carrier loader associated with each assembly station and movable between a first position in opposing relation to the movable table thereof and a second position in opposing relation to the conveyers, and having a pair of chucking stations in opposing relation to the pair of parallel conveyers, respectively, when the carrier loader is at the second position for simultaneously feeding and discharging the carriers to and from the conveyers and in opposing relation to the respective assembly station when the carrier loader is at the first position for feeding and discharging the carriers to and from the respective assembly station; a plurality of stopping members associated with respective ones of the assembly stations for selectively stopping carriers adjacent respective ones of the assembly stations; and sensing elements for detecting the presence of the carriers on the pair of parallel conveyers for controlling the stopping members in response thereto so as to selectively stop carriers adjacent respective ones of the assembly stations.

10 Claims, 23 Drawing Figures

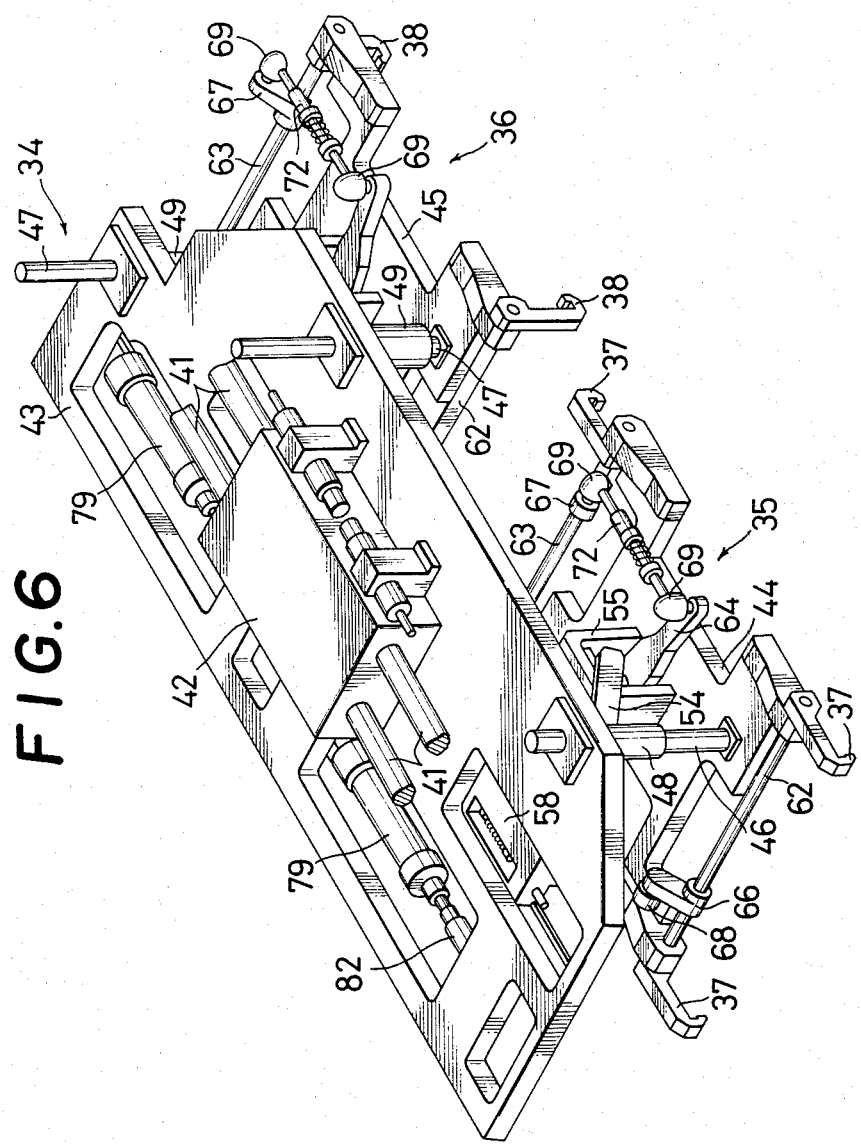

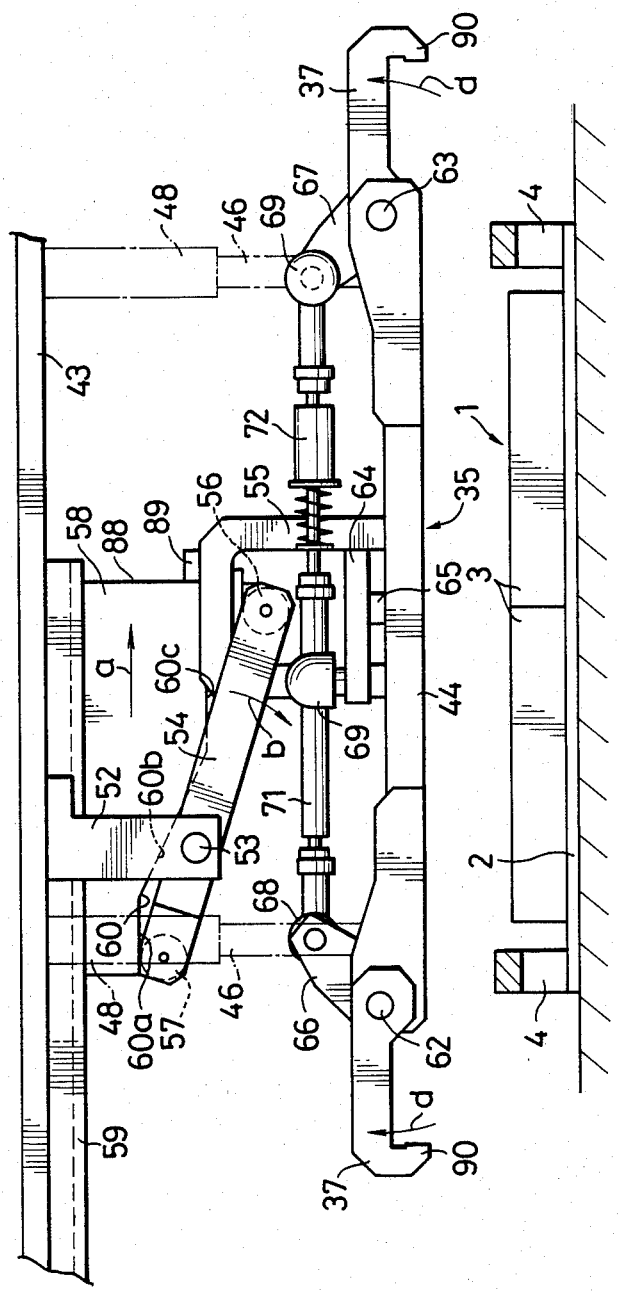

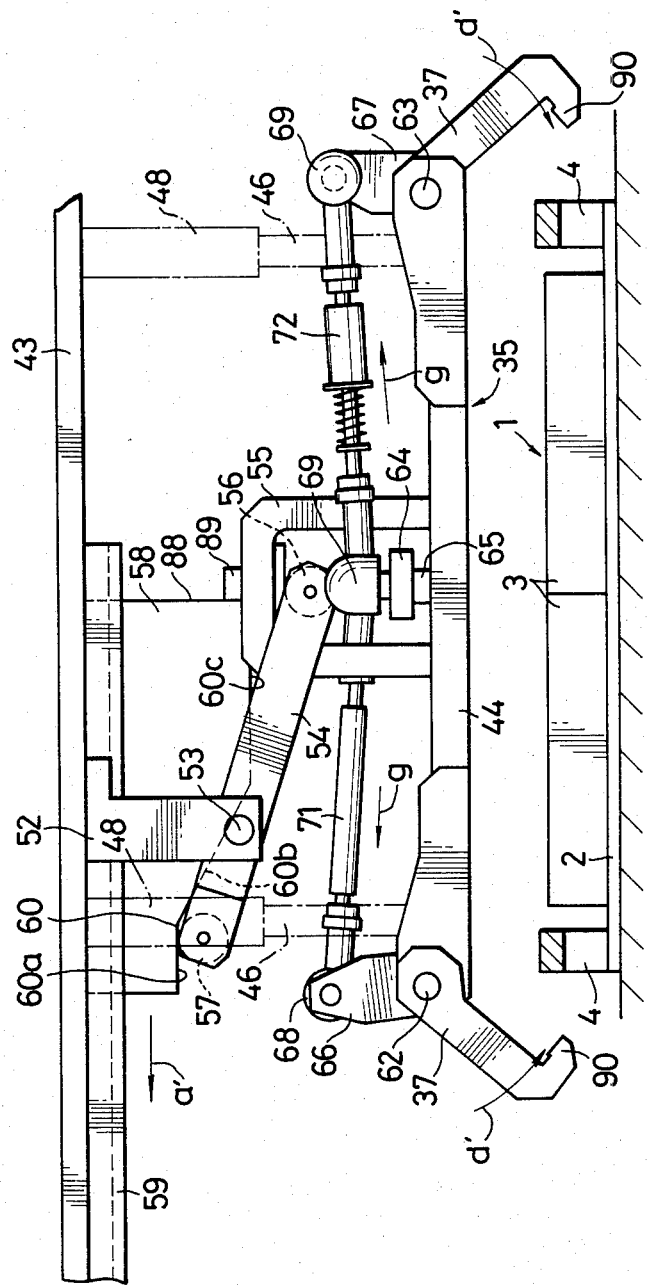

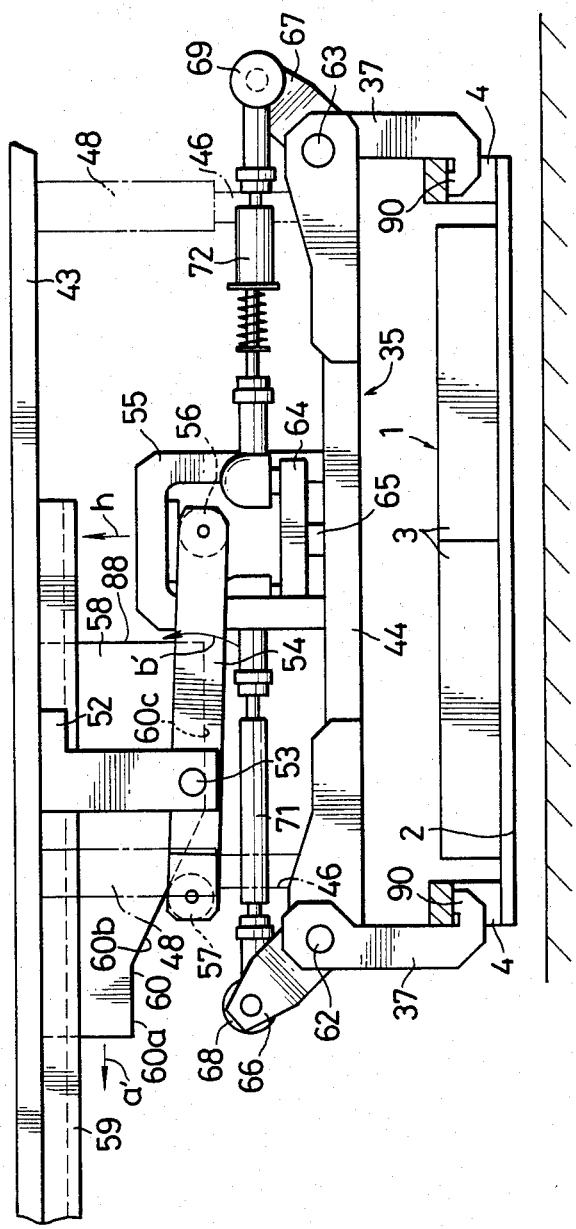

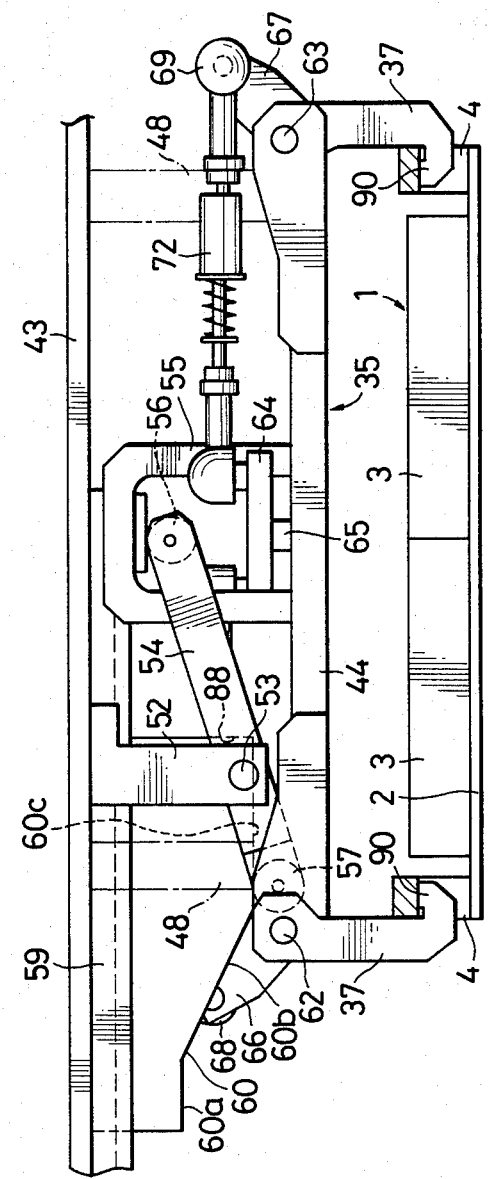

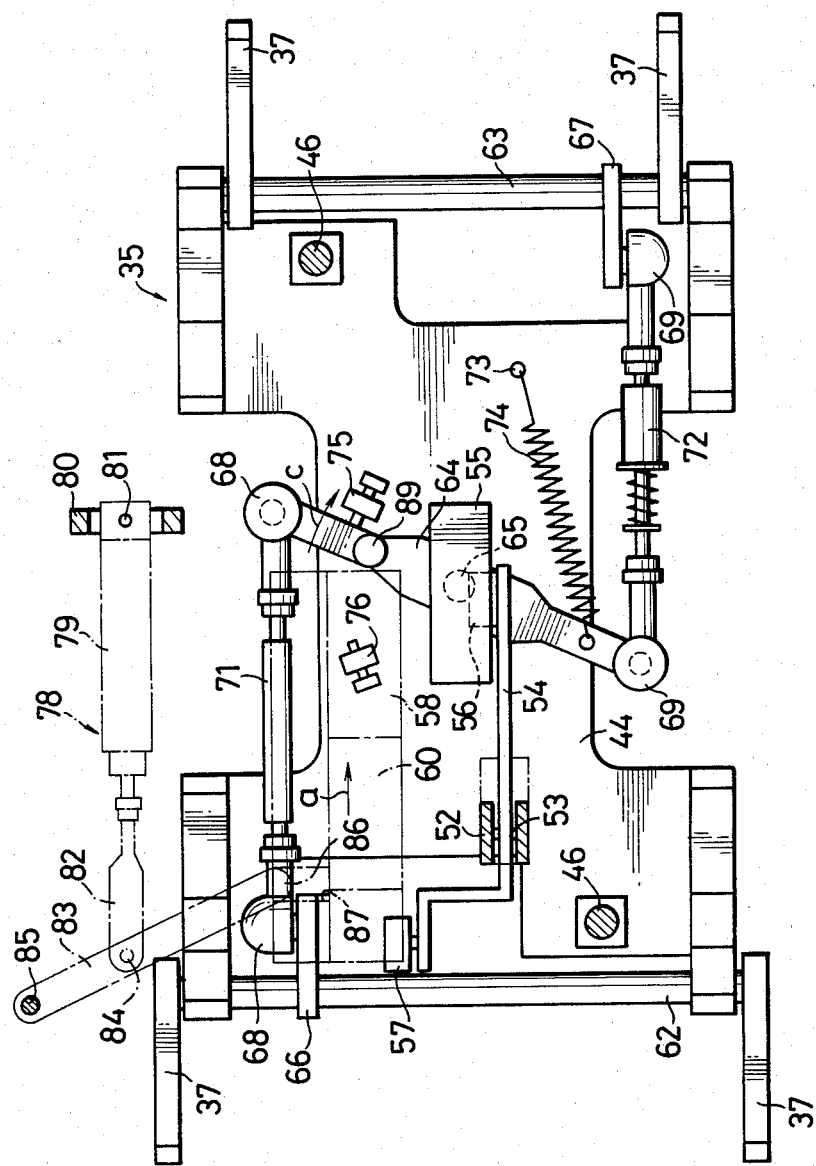

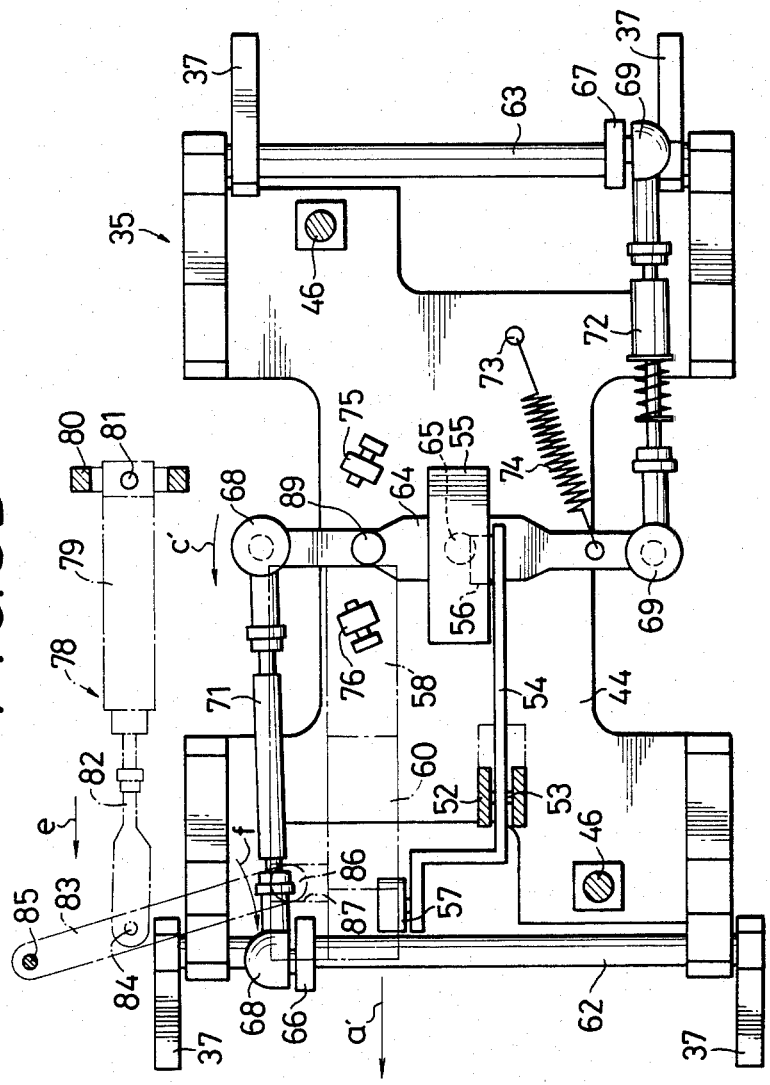

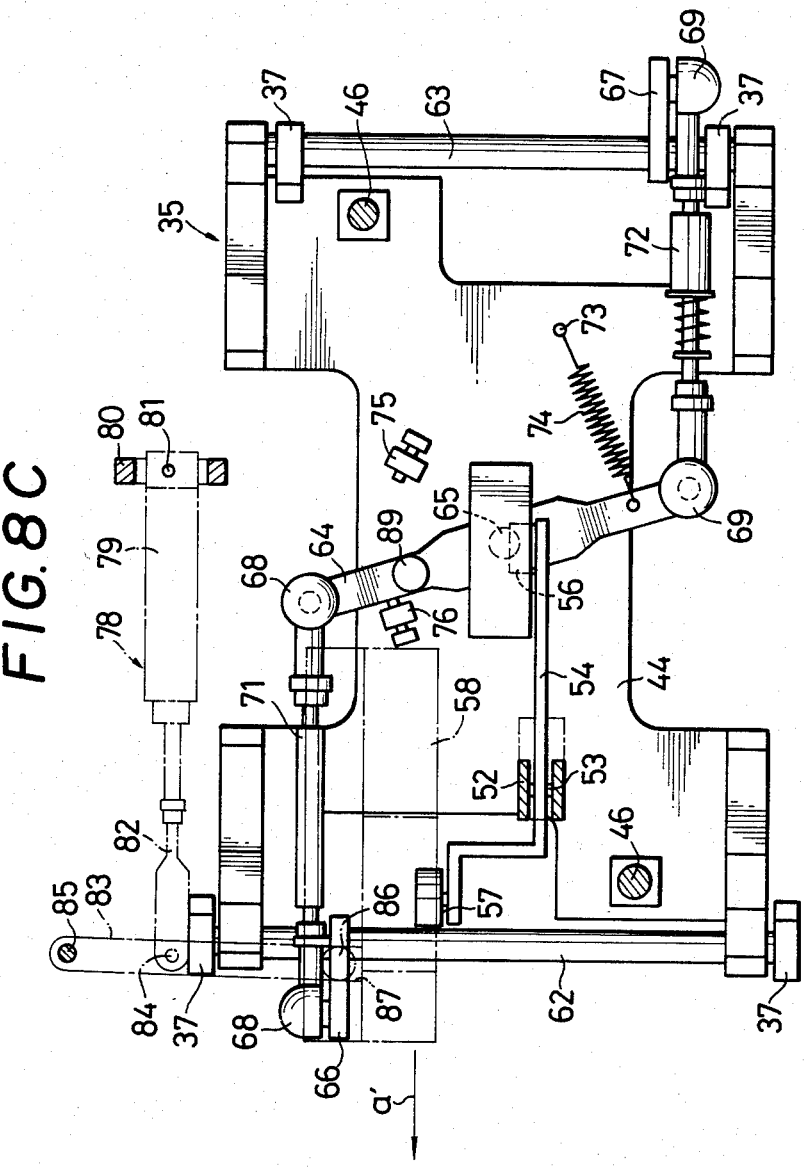

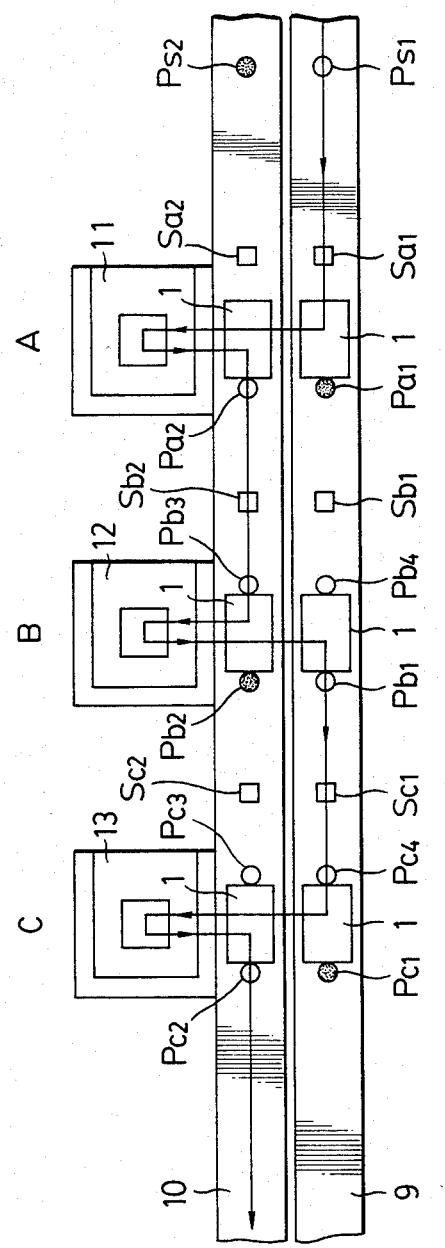

AUTOMATIC ASSEMBLING APPARATUS

BACKGROUND OF THE INVENTION

1. Field of the Invention

This invention relates generally to an automatic assembling machine and, more particularly, is directed to an automatic assembling machine of the type in which a conveyer automatically supplies a carrier to a work station for assembling parts thereon.

2. Description of the Prior Art

Automatic assembling machines are widely used in manufacturing lines for various types of equipment. In a conventional automatic assembling machine, a carrier is transferred to at least one assembly station by a single conveyer. Each assembly station performs various processing and assembling of parts on a chassis carried by a carrier, and thereafter, the carrier is discharged onto the conveyer for use in a subsequent step.

With the above-described automatic assembling machine, movement of the carrier, that is, the line of transfer of the carrier, on the conveyer and with respect to each assembly station is fixed and cannot be varied. For example, with such automatic assembling machine, a carrier having an unassembled chassis thereon cannot be fed to an assembly station simultaneously with the discharge of a carrier having an assembled chassis from the assembly station. As a result, exchange of the unassembled and assembled carriers with respect to each assembly station takes a relatively long time, resulting in loss of manufacturing time and a low assembling efficiency. It is to be appreciated that, because the line of transfer of the carrier is fixed, such conventional automatic assembling machines have an extremely low flexibility in adapting to various manufacturing equipment to be assembled and lack an adaptability to changes in the type of equipment to be manufactured or assembled. In other words, each time that the type of equipment to be manufactured or assembled is changed or a manufacturing step is changed, a plurality of assembly stations must be transferred and/or modified. This results in lengthy preparation, resulting in loss of operating time of the manufacturing equipment and a low working efficiency.

OBJECTS AND SUMMARY OF THE INVENTION

Accordingly, it is an object of this invention to provide an automatic assembling apparatus that avoids the above-described difficulties encountered with the prior art.

More particularly, it is an object of this invention to provide an automatic assembling apparatus having a high efficiency of operation.

It is another object of this invention to provide an automatic assembling apparatus having a high rate of operation.

It is still another object of this invention to provide an automatic assembling apparatus having great flexibility to changes in the design of products to be manufactured and assembled.

In accordance with an aspect of this invention, an automatic assembling apparatus includes a pair of parallel conveyer means for transferring at least one carrier means thereon in a first direction; assembly station means having movable table means on which various feeding and assembling operations can be performed with respect to the at least one carrier means; and carrier loading means movable between a first position in opposing relation to the movable table means and a second position in opposing relation to the conveyer means and having a pair of chucking stations respectively in opposing relation to the parallel conveyer means when the carrier loading means is at the second position for performing at least one of a feeding and discharge operation of the at least one carrier means thereat and in opposing relation to the assembly station means when the carrier loading means is at the first position for performing at least one of a feeding and discharge operation of the at least one carrier means thereat.

The above, and other, objects, features and advantages of the invention will be apparent from the following detailed description of an illustrative embodiment thereof which is to be read in connection with the accompanying drawings.

BRIEF DESCRIPTION OF THE DRAWINGS

FIG. 6 is a perspective view of a carrier loader as part of an assembly station of the automatic assembling apparatus of FIG. 2;

FIGS. 7A–7D are elevational views of the carrier loader of FIG. 6, illustrating the operation thereof;

FIGS. 8A–8D are bottom plan views of a portion of the carrier loader of FIG. 6, illustrating the operation thereof; and FIGS. 9A and 9B are plan views of the apparatus of FIG. 2, illustrating serial and parallel operations thereof.

DETAILED DESCRIPTION OF A PREFERRED EMBODIMENT

Figure 1:
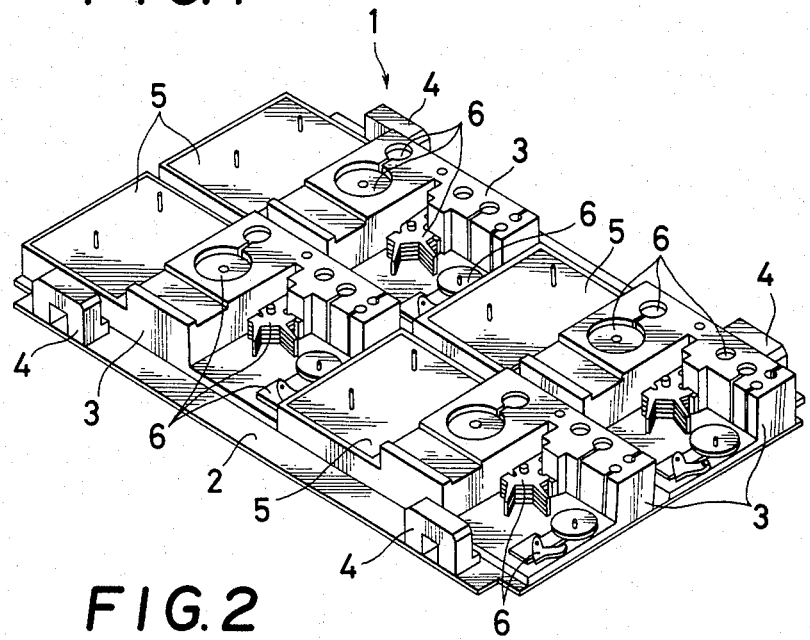
FIG. 1 is a perspective view of a carrier for use with an automatic assembling apparatus according to the present invention.

Referring to the drawings in detail, and initially to FIG. 1 thereof, a carrier 1 for use in an automatic assembling apparatus according to the present invention includes a substantially rectangular base plate 2 having four suspension handles 4 fixed to the corners of base plate 2 on two opposite sides thereof. Four pallets 3 are symmetrically arranged in alignment with each other on base plate 2, each pallet 3 having a chassis 5 and assembly parts 6, for example, various types of gears, levers, bearings and other parts to be assembled on the respective chassis 5. In this regard, carrier 1 is transferred to at least one assembly station, as will be described in greater detail hereinafter, and the various parts 6 are fed and assembled onto each chassis 5. It is to be appreciated, at this time, that other parts, such as reel shafts, screws and the like may be separately fed and assembled on each chassis 5 at each assembly station. In addition to the feeding and assembling operations of the parts on each chassis 5, other operations such as fastening of screws, lubrication, magnetization of magnetic members and other necessary and associated operations can be automatically performed at each assembly station. Further, at each assembly station, the feeding, processing and assembling operations of the parts are simultaneously performed for the four pallets 3.

Figure 2:
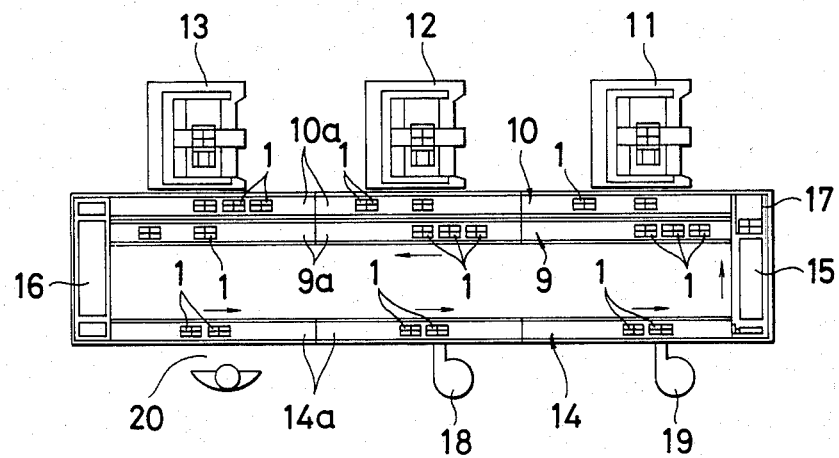
FIG. 2 is a plan view of an automatic assembling apparatus according to the present invention.
Figure 3:
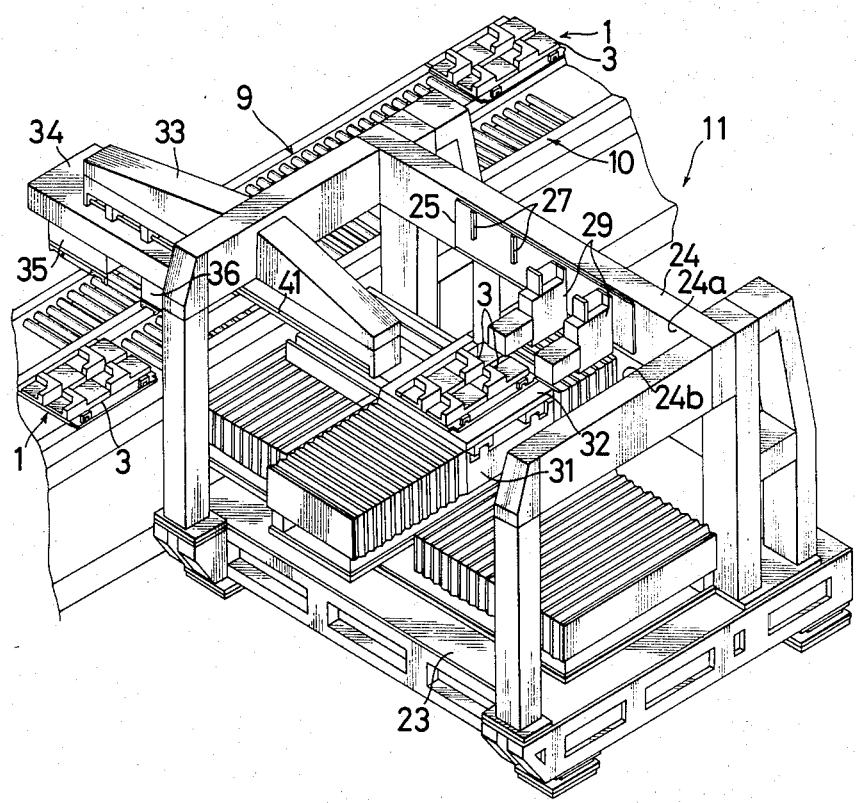
FIG. 3 is a perspective view of an assembly station of the automatic assembling apparatus of FIG. 2.

Referring now to FIG. 2, one embodiment of an arrangement of conveyers and assembly stations for an automatic assembling apparatus according to this invention will now be described. In particular, a pair of parallel and adjacent conveyers 9 and 10 are provided to transfer the carriers 1 in the direction of the arrow adjacent conveyer 9 in FIG. 2. A plurality of assembly stations, for example, three assembly stations 11, 12 and 13 in FIG. 2, are arranged outside of the conveying system adjacent conveyer 10 for performing the aforementioned feeding, processing and assembling operations with respect to the carriers 1. In this regard, conveyers 9 and 10 transport carriers 1 to and from the various assembly stations 11, 12 and 13 for feeding, processing and assembling thereat.

In addition, another conveyer 14 is spaced from and parallel to conveyer 9, and a pair of conveyers 15 and 16 are provided for connecting the respective ends of conveyer 14 to the corresponding ends of conveyers 9 and 10. In this regard, conveyers 9, 10, 14, 15 and 16 define an endless conveyer line, with carriers 1 being transferred by the endless conveyer line in the directions indicated by the arrows in FIG. 2. The conveyors may be formed by any suitable conveyor system, for example, the conveyors may be comprised of roller conveyors, that is, each conveyer being comprised of a plurality of rotatable rollers over which carriers 1 travel. In this regard, carriers 1 can be stopped at any position along the conveyors by means of appropriate stopping members interposed in their path and can immediately resume their travel upon release of the stopping members. Conveyors 9, 10 and 14 are each divided into a plurality of short conveying sections 9a, 10a and 14a, respectively, each conveying section corresponding to a respective one of the assembly stations. In this manner, independent feeding and discharging of carriers 1 with respect to assembly stations 11, 12 and 13 can be easily accomplished.

A distributor 17 is arranged at the front end of conveyer 15, that is, the end adjacent conveyers 9 and 10, for selectively feeding carriers 1 to either conveyer 9 or conveyer 10, as will be apparent hereinafter. In addition, loading stations 18 and 19 are arranged at, for example, two downstream positions of conveyer 14 for supplying carriers 1 to the conveying system, and an unloading station 20 is arranged at the upstream position of conveyer 14 for removing assembled carriers 1 from the conveying system. In this manner, four chassis 5 and associated parts 6 to be assembled thereon are placed on each carrier 1, and the latter are then supplied to the respective loading stations 18 and 19 where they are transferred to conveyer 14. The latter conveyer then moves carrier 1 to conveyer 15, and distributor 17 thereof selectively feeds carriers 1 to either conveyer 9 or conveyer 10 according to a preset distribution arrangement. Carriers 1 can then be transferred or fed to first assembly station 11 by the respective conveyer 9 or 10. In particular, carriers 1 from conveyor 9 and conveyor 10 are transferred to assembly station 11 by a carrier loader thereat, which will be described in more detail hereinafter, and placed on a movable table of assembly station 11, at which feeding, processing and assembling operations of the parts 6 on chassis 5 are automatically performed. Upon completion of the above operations, carriers 1 are discharged onto one of conveyors 9 and 10 by the carrier loader to be transferred to the next assembly station 12. It is to be appreciated that the carrier loader is movable between a first position in opposing relation to the movable table of assembly station 11 and a second position in opposing relation to conveyors 9 and 10. Feeding and discharge of carriers 1 with respect to assembly stations 12 and 13 at downstream positions of conveyors 9 and 10 are performed in a similar manner. Upon completion of the above operations with respect to assembly station 13, carriers 1 are transferred to unloading station 20 by conveyors 16 and 14 and unloaded from conveyor 14 by the operator. As will be apparent from the discussion hereinafter, by switching the feeding and discharge lines of carriers 1 at assembly stations 11, 12 and 13 by means of conveyors 9 and 10, the various steps of operation may be easily varied.

Referring now to FIGS. 3, 4 and 5A-5H, the construction of assembly station 11 according to one embodiment of this invention will now be described. It is to be appreciated, however, that assembly stations 12 and 13 are also of the same construction. In particular, assembly station 11 includes a horizontal substantially U-shaped mounting beam 24 supported above a horizontal base 23 by vertical members and parallel thereto. The inner side surfaces 24a and 24b of the connecting segment and a leg, respectively, of U-shaped mounting beam 24 have mounting plates 25 and 26, respectively, secured thereto, mounting plates 25 and 26 therefore being perpendicular to each other. A plurality of keys 27 are vertically mounted on mounting plate 25 and are spaced from each other at predetermined intervals in the X-axis horizontal direction. In like manner, a plurality of keys 28 are vertically mounted on mounting plate 26 and are spaced from each other at predetermined intervals in the Y-axis horizontal direction. Working units 29 and 30 are mounted on selected ones of keys 27 and 28, respectively, and can be easily removed from one key and mounted on another key. The working units include working heads (not shown) mounted on the lower ends thereof and which are vertically reciprocable.

Figure 4:
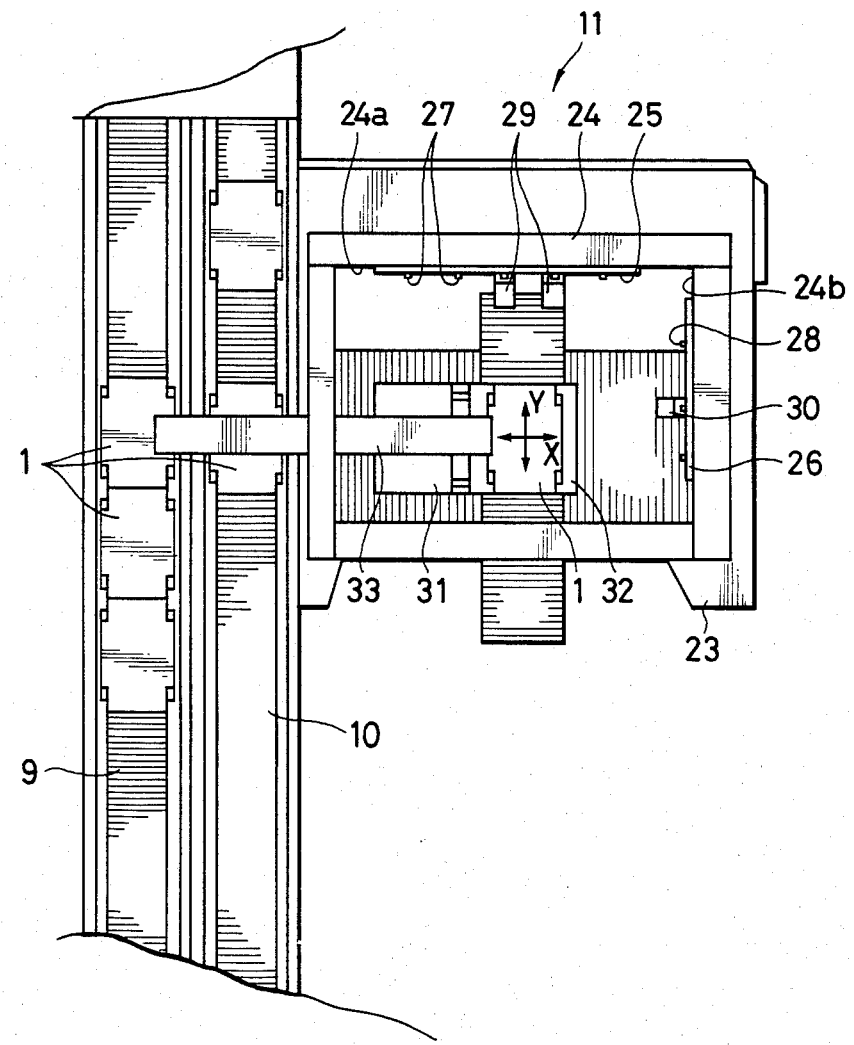
FIG. 4 is a plan view of the assembly station of FIG. 3.

A movable table 31 is mounted on base 23 and is adapted to be driven in the X-axis and Y-axis directions in the horizontal plane of base 23, as shown in FIG. 4, and a shift table 32 is also horizontally reciprocable within a limited range in the X-axis direction on movable table 31. It is to be appreciated that the feeding, processing and assembling operations with respect to carrier 1 and the four chassis 5 thereon occur on shift table 32. It is to be further appreciated, however, that shift table 32 is provided to minimize the movement of table 31 and thereby provide a compact machine, but may be eliminated if desired.

A loader guide 33 is horizontally suspended from the other leg of mounting beam 24 in the X-axis direction, and a carrier loader 34 is slidably mounted to the underside of loader guide 33 for horizontally reciprocable movement in the X-axis direction between a first position in opposing relation to the upper surface of movable table 31 of assembly station 11 and a second position in opposing relation to the upper surfaces of conveyers 9 and 10. Carrier loader 34 includes first and second chucking stations 35 and 36, which will be discussed in greater detail hereinafter, and which are in opposing relation to conveyors 9 and 10, respectively, when carrier loader 34 is moved to its second position.

Chucking stations 35 and 36 are used for transferring carriers 1 between conveyors 9 and 10 and shift table 32, and accordingly, chucking stations 35 and 36 include four suspension pawls 37 and 38, respectively, for engaging with the four suspension handles 4 of each carrier 1 to lift the carriers from conveyors 9 and 10 or shift table 32.

Figure 5A:
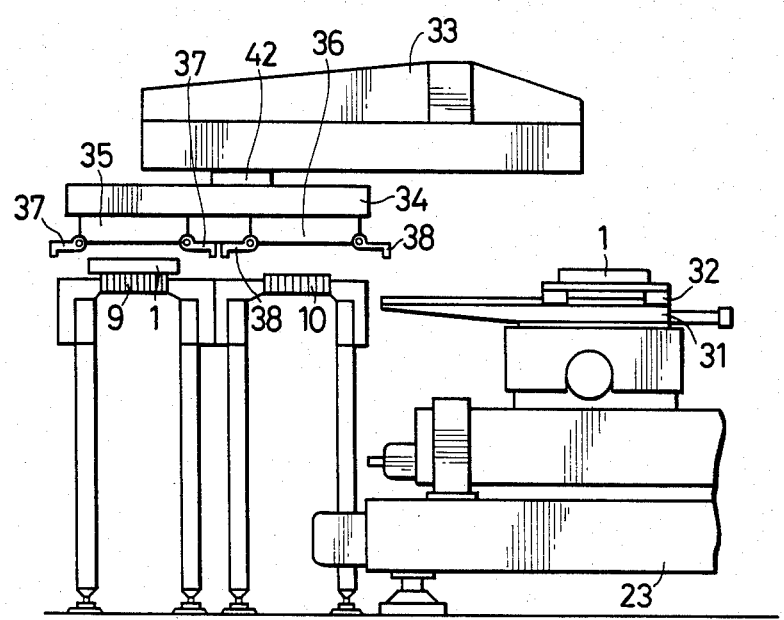
FIGS. 5A–5H are end elevational views of a portion of the automatic assembling apparatus of FIG. 2, illustrating the operation thereof.
Figure 5B:
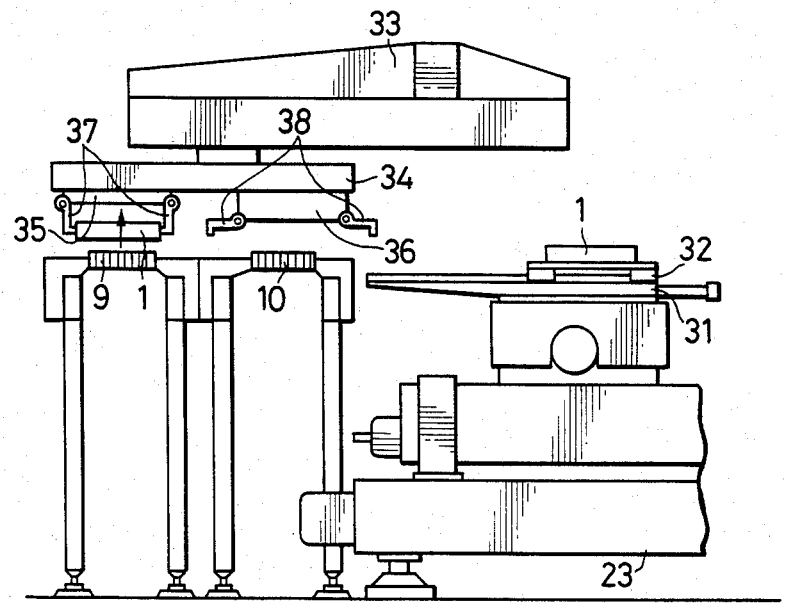
Figure 5C:
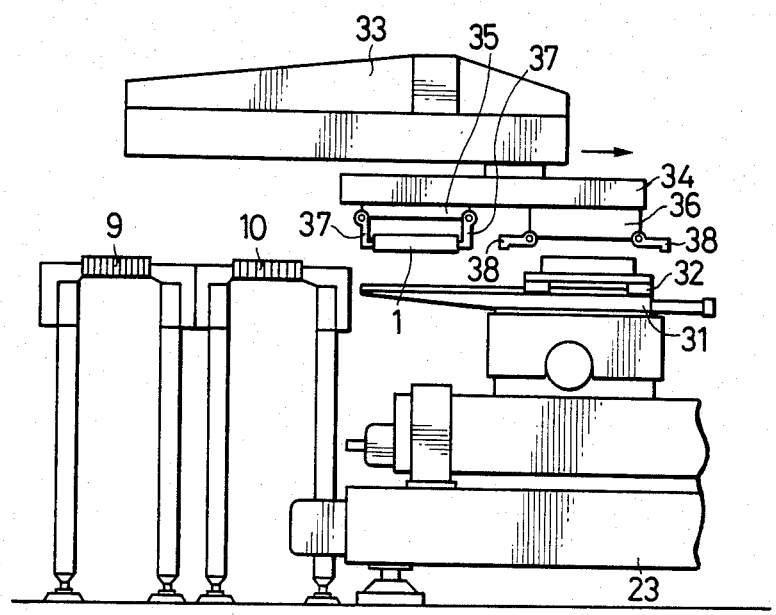
Figure 5D:
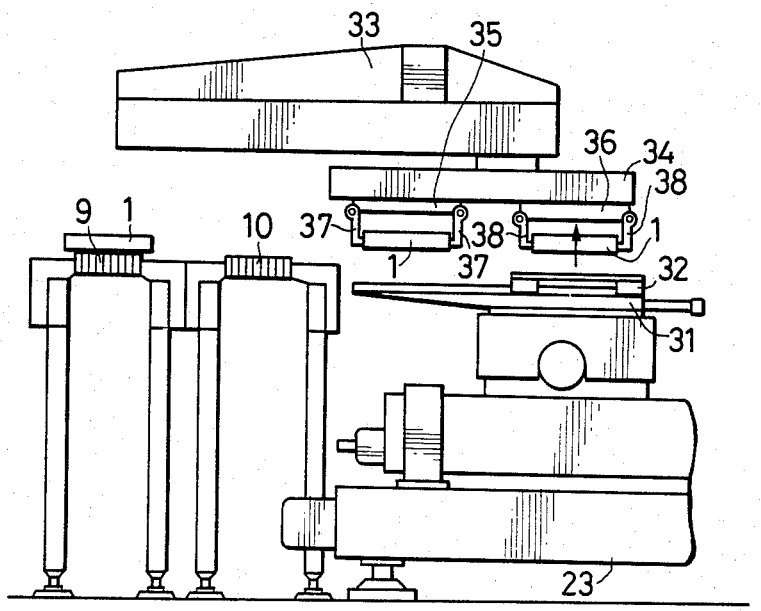
Figure 5E:
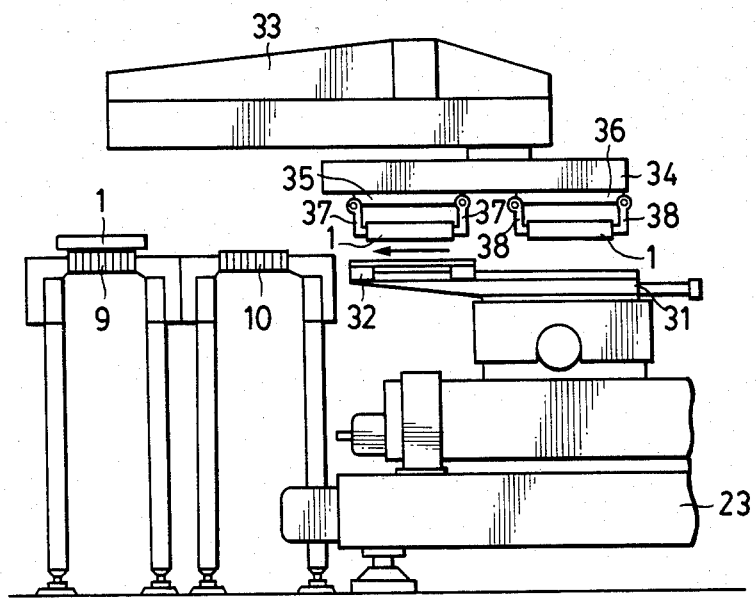
Figure 5F:
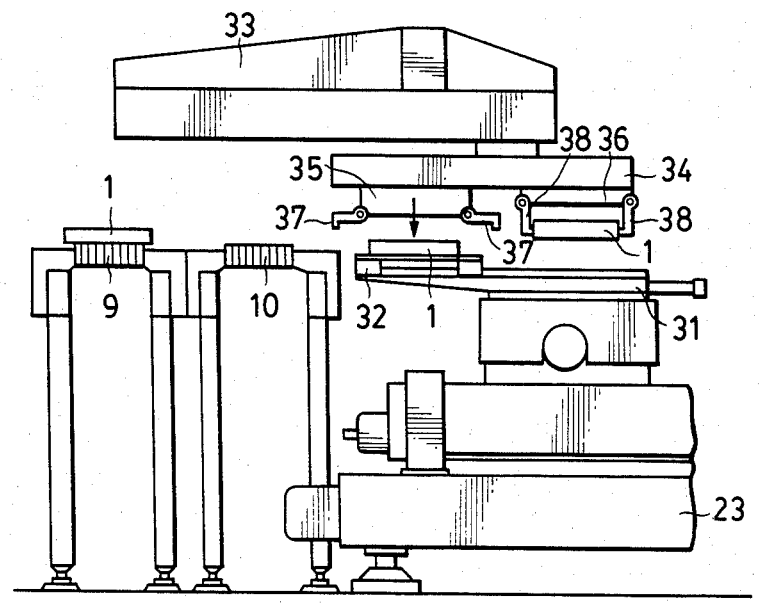
Figure 5G:
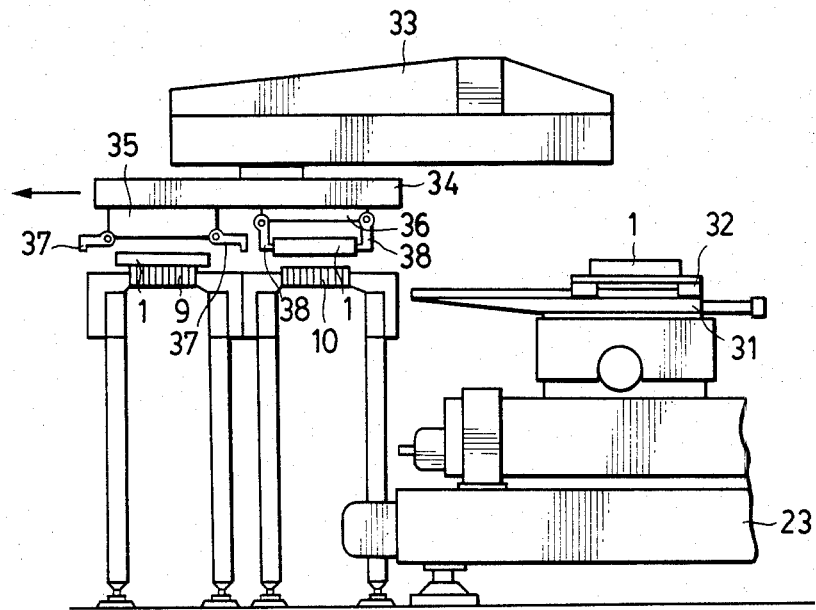
Figure 5H:
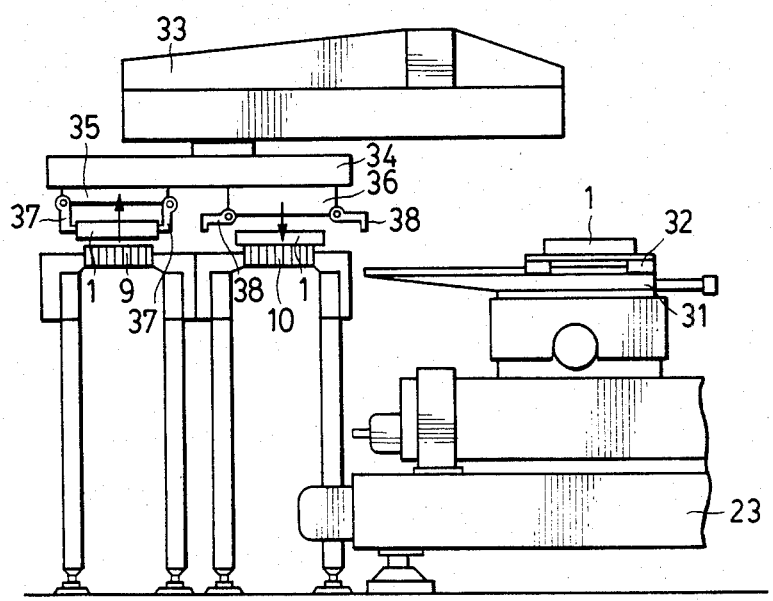

The general operation of the automatic assembling apparatus according to this invention is shown in FIGS. 5A-5H. In particular, in FIG. 5A, an assembled carrier 1 is positioned on shift table 32 and an unassembled carrier 1 is transferred by conveyor 9 to a position in front of assembly station 11 where it is restrained. In the first step of operation, suspension pawls 37 of chucking station 35 engage suspension handles 4 of carrier 1 positioned on conveyor 9 and lift carrier 1 upwardly in the vertical direction, as shown by the arrow in FIG. 5B, off conveyor 9. Then, as shown in FIG. 5C, carrier loader 34 is moved to the first position above movable table 31 of assembly station 11 and, as shown in FIG. 5D, suspension pawls 38 of chucking station 36 of carrier loader 34 engage suspension handles 4 of the carrier on shift table 32 and lift this carrier in the upward direction, as shown by the arrow in FIG. 5D, off shift table 32. It is to be appreciated that, in this state, both the unassembled and assembled carriers are lifted by carrier loader 34. Then, as shown in FIG. 5E, the empty shift table 32 is moved in the X-axis direction below chucking station 35 by movement of movable table 31 and/or shift table 32, and thereafter, as shown in FIG. 5F, the unassembled carrier held by pawls 37 is lowered and positioned on shift table 32. Thereafter, movable table 31 is moved in the X-axis and Y-axis directions below the working heads of working units 29 and 30, and the latter are vertically and synchronously moved therewith for performing feeding, processing and assembling operations of parts 6 on the four chassis 5 on the carrier which is positioned on shift table 32. During these latter operations, carrier loader 34 is moved to the second position above and in opposing relation to conveyors 9 and 10, as shown in FIG. 5G, whereupon assembled carrier 1 held by suspension pawls 38 of chucking station 36 is lowered and positioned on conveyor 10. During the release of carrier 1 by suspension pawls 38, suspension pawls 37 can simultaneously engage another unassembled carrier on conveyor 9, and thereafter, lift such carrier off conveyor 9 for the start of another cycle, as shown in FIGS. 5G and 5H.

Referring now to FIGS. 6, 7A-7D and 8A-8D, carrier loader 34 according to one embodiment of this invention will now be described in greater detail. Carrier loader 4 includes a horizontal suspension plate 43 having a guide block 42 secured to the upper surface thereof and through which a pair of horizontal and parallel guide rails 41 are positioned, the latter of which may be secured to loader guide 33. In this manner, suspension plate 43 is slidably movable along guide rails 41, as shown in FIG. 6, between the aforementioned first and second positions. A lift plate 44 is horizontally supported below suspension plate 43 by a pair of guide shafts 46 fixed to two opposite corners of lift plate 44 and which extend vertically upward therefrom through two guide cylinders 48 fixed to one half of suspension plate 43. In like manner, a lift plate 45 is horizontally supported below suspension plate 43, parallel to lift plate 44, by a pair of guide shafts 47 fixed to opposite corners of lift plate 45 and which extend vertically upward therefrom through a pair of guide cylinders 49 fixed to the other half of suspension plate 43. In this regard, lift plates 44 and 45 are vertically reciprocable by guide shafts 46 and 47 extending through guide cylinders 48 and 49, respectively.

The aforementioned suspension pawls 37 are mounted to the four corners of lift plate 44 and suspension pawls 38 are mounted to the four corners of lift plate 45. It is to be appreciated that lift plates 44 and 45 and the operating assemblies therefor, which will be discussed in greater detail hereinafter, define the aforementioned chucking stations 35 and 36, respectively, which are adapted to move vertically, and horizontally in the X-axis direction. In particular, chucking stations 35 and 36 are moved vertically during movement of lift plates 44 and 45 by guide shafts 46 and 47, respectively. In addition, suspension plate 43 is reciprocable in the X-axis direction along guide rails 41 by an air cylinder (not shown) for moving suspension plate 43, and thereby chucking stations 35 and 36, between the aforementioned first and second positions.

Referring specifically now to FIGS. 7A-7D and 8A-8D, the construction of chucking station 35 will now be described. It is to be appreciated, however, that the other chucking station 36 is of the same construction. In particular, an L-shaped lever support plate 52 is fixed to the underside of suspension plate 43, and a pivot lever 54 is pivotally supported at the lower end thereof by a horizontally extending fulcrum shaft 53. A substantially U-shaped suspension frame 55 has its legs fixed to a middle position of the upper surface of lift plate 44 between the guide shafts 46. A lift roller 56 is rotatably mounted at one end of pivot lever 54 and is positioned against the underside of the connecting segment of suspension frame 55 to support the latter and so that vertical movement of suspension frame 55, and thereby lift plate 44, is controlled by rotation of pivot lever 54 about fulcrum shaft 53.

A cam follower roller 57 is rotatably mounted at the other end of pivot lever 54 and rides against the lower surface of a slide cam 58 slidably mounted in the horizontal direction to the underside of suspension plate 43. In particular, slide cam 58 is guided by a cam guide 59 fixed to the lower surface of suspension plate 43 so as to be horizontally slidable relative to suspension plate 43. It is to be appreciated that, since the weight of lift plate 44 biases pivot lever 54 in the clockwise direction, as indicated by arrow b of FIG. 7A, through suspension frame 55, cam follower roller 57 is biased upwardly into contact with the lower cam surface 60 of slide cam 58.

An air piston-cylinder arrangement 78 (FIGS. 8A-8D) is horizontally arranged to one end of lift plate 44 and includes a cylinder body 79 having one end thereof pivotally supported in the horizontal direction by a vertical shaft 81 secured to a cylinder hook 80 which, in turn, is fixed to the lower surface of suspension plate 43. A cylinder rod or piston 82 is partially positioned within cylinder body 79 in a conventional manner and extends from the opposite end of cylinder body 79. The free end of cylinder rod 82 is pivotally secured to a pivot lever 83 by means of a support pin 84 for horizontal movement in the axial direction of cylinder rod 82, that is, in the direction of arrow e in FIG. 8B. One end of pivot lever 83 is pivotally supported at the lower surface of suspension plate 43 by a fulcrum shaft 85 and a roller 86 is rotatably supported at the opposite end of pivot lever 83 and is positioned in a groove 87 formed in one side of cam surface 60 of slide cam 58. In this manner, movement of cylinder rod 82 in the direction of arrow e in FIG. 8B, causes slide cam 58 to move in the same direction, resulting in roller 57, and thereby pivot lever 54, being rotated in the direction of arrow b', as shown is FIG. 7C, as roller 57 rides from an upper horizontal portion 60a of cam surface 60, onto a downwardly sloping portion 60b thereof, and finally onto a lower horizontal portion 60c of cam surface 60. As a result, lift plate 44 is raised in the vertical direction through lifter roller 56 and U-shaped suspension frame 55.

Suspension pawls 37 are rotatably supported at the four corners of lift plate 44 by rotary shafts 62 and 63 at opposite ends of lift plate 44. A pivot lever 64 extends through suspension frame 55 and is pivotally supported in the horizontal direction of lift plate 44 through a vertical fulcrum shaft 65 extending from lift plate 44 through a substantially central portion of pivot lever 64. The ends of pivot lever 64 are connected by connecting rods 71 and 72, respectively, to arms 66 and 67 fixed to rotary shafts 62 and 63, respectively. In particular, connecting rod 71 is connected between one end of pivot lever 64 and arm 66 by universal joints 68, and connecting rod 72 is connected between the opposite end of pivot lever 64 and arm 67 by universal joints 69. In addition, pivot lever 64 is biased in the clockwise direction, indicated by arrow c' in FIG. 8B, by a coil spring 74 connected between pivot lever 64 and a spring hook 73 fixed to the upper surface of lift plate 44. A pair of stopping members 75 and 76 are also fixed to the upper surface of lift plate 44 for limiting the range of pivotal movement of pivot lever 64. In addition, pivot lever 64 includes a roller 89 which may be biased into contact with an end 88 of slide cam 58 by coil spring 74.

In the lifting operation of a carrier 1 from conveyer 9, conveyer 10 or shift table 32, carrier loader 34 starts in the position shown in FIGS. 7A and 8A. In this state, slide cam 58 is moved to its rightmost position, as indicated by arrow a in, in FIG. 7A. Accordingly, roller 57 is urged against upper horizontal portion 60a of cam surface 60, and pivot lever 54 is pivoted in the direction indicated by arrow b in FIG. 7A, resulting in lift plate 44 being lowered to its lowermost position. In addition, since the end 88 of slide cam 58 biases roller 89, and therefore pivot lever 64, in the direction indicated by arrow c in FIG. 8A, against the biasing force of spring 74, suspension pawls 37 are rotated in the directions indicated by arrows d in FIG. 7A so as to be positioned horizontally with respect to and out of engagement with carrier 1.

When cylinder rod 82 of piston-cylinder arrangement 78 is moved in the direction indicated by arrow e in FIG. 8B, pivot lever 83 is pivotally rotated in the direction of f in FIG. 8B about shaft 85. In this manner, roller 86 at the free end of pivot lever 83 causes slide cam 58 to be moved in the direction indicated by arrow a', as shown in FIG. 7B. During such movement of slide cam 58, roller 57 rides along upper horizontal surface 60a of cam surface 60 and, at such time, does not raise lift plate 44. However, during such initial movement, pivot lever 64 is biased in the direction indicated by arrow c' in FIG. 8B by spring 74, thereby urging connecting rods 71 and 72 in the directions indicated by arrows g in FIG. 7B. This, in turn, causes pivoting of rotary shafts 62 and 63 in the directions of arrows d' through arms 66 and 67, respectively. In this manner, the four suspension pawls 37 are simultaneously pivoted in the directions indicated by arrows d', to the position shown in FIG. 7C. It is to be appreciated that, in this latter position, hook-shaped ends 90 of suspension pawls 37 engage with suspension handles 4 of carrier 1. Further, in this latter position shown in FIG. 7C, further rotation of pivot lever 64 is prevented by stopping member 76, as shown in FIG. 8C.

Substantially simultaneously with the engagement of suspension handles 4 by suspension pawls 37, lift plate 44, and therefore carrier 1, is lifted vertically in the direction of arrow h in FIG. 7C. In particular, as slide cam 58 continues to move in the direction indicated by arrow a', roller 57 rides along downwardly sloping portion 60b. As a result, pivot lever 54 is pivoted in the direction indicated by arrow b', and lift plate 44 is lifted by roller 56 at the end of pivot lever 54, through suspension frame 55. Since suspension pawls 37 are engaged with suspension handles 4, carrier 1 is also lifted in the upward or vertical direction, as indicated by arrow h in FIG. 7C.

Figure 8D:
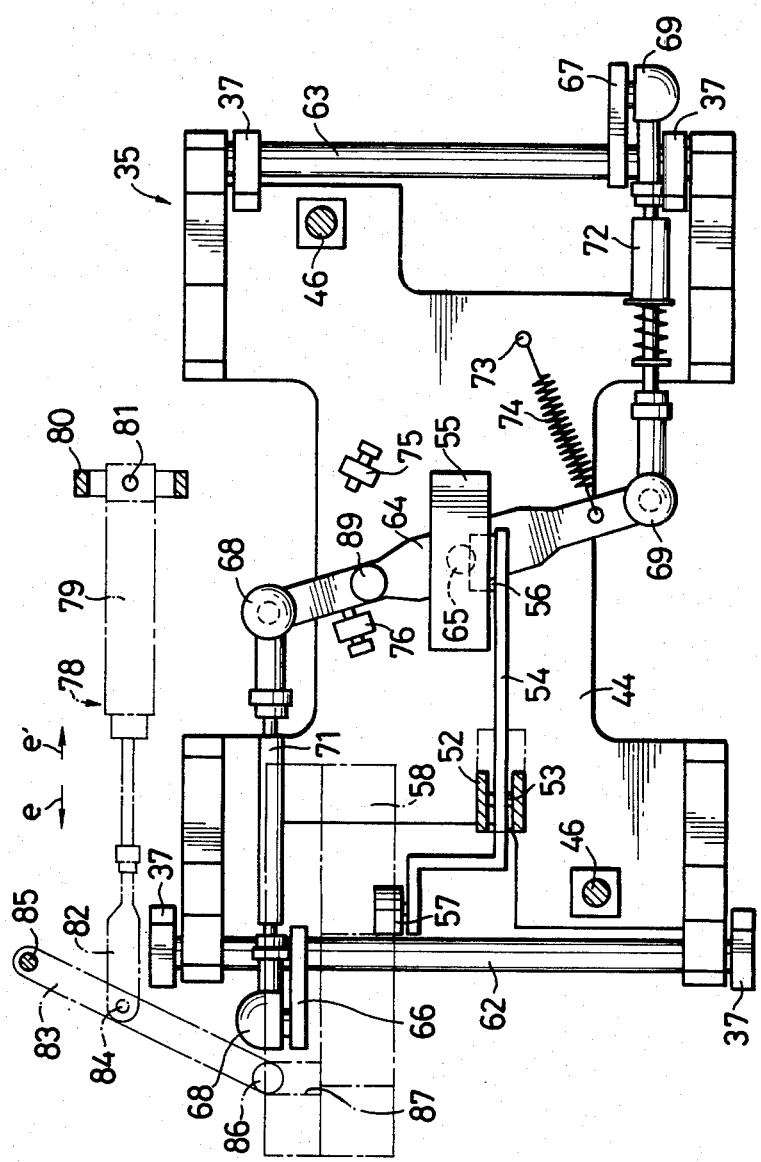

When slide cam 58 reaches its leftmost position, as shown in FIG. 7D, roller 57 is in engagement with lower horizontal portion 60c of cam surface 60. Accordingly, pivot lever 54 is pivoted in its maximum counterclockwise direction, as viewed in FIG. 7D, whereby lift plate 44 and carrier 1 are vertically lifted to a maximum vertical position off conveyer 9, conveyer 10 or shift table 32. In this state, the lifting operation of lift plate 44 is completed, as shown in FIGS. 7D and 8D.

It is to be appreciated that the lowering operation for carrier 1 by carrier loader 34 follows the reverse steps of the above-described lifting operation. In particular, during the lowering operation, cylinder rod 82 of piston-cylinder arrangement 78 is retracted in the direction indicated by arrow e' in FIG. 8D, thereby restoring slide cam 58 to the original position shown in FIGS. 7A and 8A. As a result, lift plate 44 is lowered to its lowermost position shown in FIG. 7A and suspension pawls 37 are pivoted upward to the positions shown in FIG. 7A, to position carrier 1 on either conveyer 9, conveyer 10 or shift table 32.

Figure 9B:
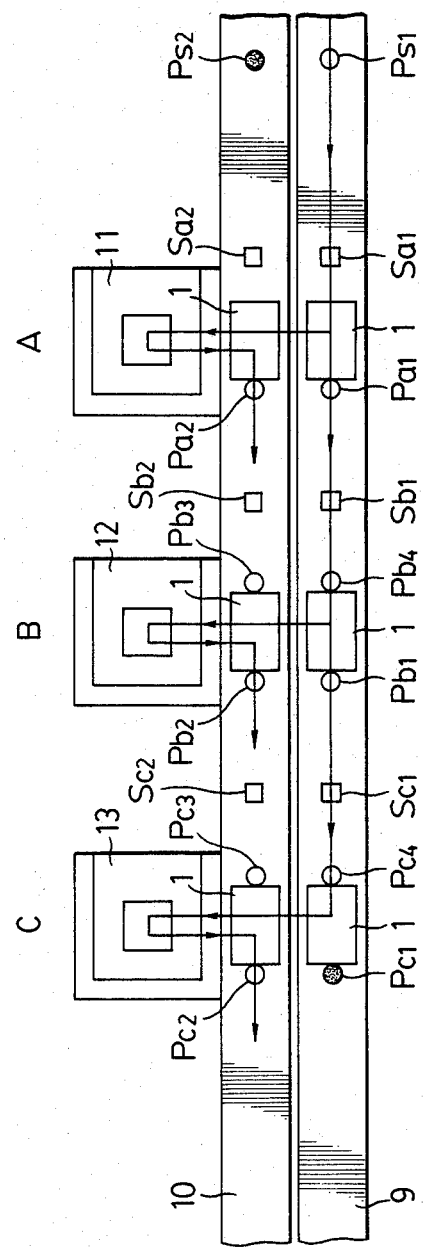

Referring now to FIGS. 9A and 9B, a serial-type operation, that is, an operation in which carriers 1 are serially transferred to assembly stations 11, 12 and 13 will now be described with reference to FIG. 9A, and a parallel-type operation, that is, an operation in which carriers 1 are transferred in parallel to assembly stations 11, 12 and 13 will be described with reference to FIG. 9B. As shown in FIG. 9A, the automatic assembling apparatus according to one embodiment of the present invention includes stopping members $P_{S1}$ and $P_{S2}$ at the starting positions of conveyors 9 and 10, respectively, stopping members $P_{a1}$ and $P_{a2}$ adjacent assembly station 11 for conveyors 9 and 10, respectively, stopping members $P_{b1}$ and $P_{b4}$ and stopping members $P_{b2}$ and $P_{b3}$ adjacent assembly station 12 for conveyors 9 and 10, respectively, and stopping members $P_{c1}$ and $P_{c4}$ and stopping members $P_{c2}$ and $P_{c3}$ adjacent assembly station 13 for conveyors 9 and 10, respectively, each of which may be comprised of a pin driven by an electromagnetic plunger, whereby the pins are adapted to extend upwardly from between the rollers of conveyers 9 and 10. In other words, when a stopping member projects above conveyer 9 or conveyer 10, a carrier 1 which is transferred by the respective conveyer can be stopped to prevent further motion thereof, and thereby can be positioned correctly for transfer between the conveyor and respective assembly station. When the respective stopping member is withdrawn below the conveyer, the carrier 1 which had been stopped can again be moved by the respective conveyer. In addition, the automatic assembling apparatus according to this invention includes sensors $S_{a1}$ and $S_{a2}$ associated with conveyors 9 and 10, respectively, and located upstream of assembly station 11, sensors $S_{b1}$ and $S_{b2}$ associated with conveyors 9 and 10, respectively, and located upstream of assembly station 12, and sensors $S_{c1}$ and $S_{c2}$ associated with conveyors 9 and 10, respectively, and located upstream of assembly station 13. The sensors may be of the non-contact or contact type, and operate to detect the carriers 1 moved by conveyors 9 and 10 so as to control the stopping members upstream of the respective sensors.

In the serial operation shown by FIG. 9A, stopping members $P_{S2}$, $P_{a1}$, $P_{b2}$ and $P_{c1}$ are initially set to project above conveyors 9 and 10. The remaining stopping members are set in their withdrawn positions, that is, below the respective conveyors. A carrier 1 is fed by conveyor 9 to a position in front of first assembly station 11 and abuts against stopping member $P_{a1}$ so that further movement thereof is inhibited. Further, upon detection of carrier 1 by sensor $S_{a1}$, sensor $S_{a1}$ causes stopping member $P_{S1}$ to project above conveyor 9 and thereby temporarily prevent a succeeding carrier 1 from being supplied along conveyor 9. The carrier 1 which is stopped at the position in front of assembly station is picked up by carrier loader 34 and supplied to assembly station 11, in the manner previously described. At such time, stopping member $P_{S1}$ is temporarily withdrawn so that a new carrier 1 can be transferred by conveyor 9 to a position in abutment against stopping member $P_{a1}$. After the feeding, processing and assembling operations at assembly station 11, the assembled carrier 1 therefrom is transferred to conveyor 10 and the new unassembled carrier from conveyor 9 is substituted therefor at assembly station 11, in the manner previously described. The assembled carrier 1 discharged onto conveyor 10 is then transferred to a position in front of assembly station 12 and is stopped from further movement by stopping member $P_{b2}$. Thereafter, carrier 1 is transferred to assembly station 12 by carrier loader 34 thereat, and at which various parts are assembled with the carrier. The assembled carrier is then discharged onto conveyor 9 which transfers the carrier to a position in front of assembly station 13 in an abutting relation with stopping member $P_{c1}$. The carrier is then tranferred from conveyor 9 by carrier loader 34 thereat to assembly station 13 where the aforementioned operations are performed. Thereafter, the assembled carrier is discharged onto conveyor 10 which, along with conveyers 16 and 14, move the assembled carrier to unloading station 20.

In the parallel mode of operation, as shown in FIG. 9B, conveyer 9 is used as a feeding line for the carriers while conveyor 10 is used as a discharge line for the carriers. In this mode of operation, stopping members $P_{S2}$ and $P_{c1}$ are set to project above conveyors 9 and 10, respectively, while stopping members $P_{a2}$, $P_{b2}$ and $P_{c2}$ are always maintained in their withdrawn position. Stopping members $P_{S1}$, $P_{a1}$ and $P_{b1}$ are controlled by sensors $S_{a1}$, $S_{b1}$ and $S_{c1}$, respectively.

At the start of operation, stopping member $P_{S1}$ is in its withdrawn position and three carriers 1 are sequentially transferred to positions in front of assembly stations 11, 12 and 13, respectively, by conveyor 9. In particular, unless sensor $S_{c1}$ detects a carrier 1, stopping members $P_{b1}$, $P_{b4}$, and $P_{a1}$ are maintained in their withdrawn positions. Thus, a first carrier 1 is transferred to a position in front of assembly station 13 and is prevented from further movement by stopping member $P_{c1}$. When sensor $S_{c1}$ detects such carrier, stopping member $P_{b1}$ is projected above conveyor 9 to prevent further movement of the next carrier 1 and to thereby position this latter carrier adjacent intermediate assembly station 12. In like manner, when sensor $S_{b1}$ detects this latter carrier, stopping member $P_{a1}$ is projected above conveyer 9, resulting in the next carrier being stopped at a position adjacent assembly station 11. Finally, when sensor $S_{a1}$ detects this latter carrier, stopping member $P_{S1}$ is projected above conveyer 9 so that feeding of the next carrier by conveyer 9 is temporarily stopped.

The respective carriers 1 adjacent assembly stations 11, 12 and 13 are picked up by the respective carrier loaders 34 and transferred to the respective assembly stations 11, 12 and 13 where the aforementioned operations are performed. After completion of such operations, the respective carriers are then discharged onto conveyor 10. It is to be appreciated that, in order to avoid discharge of a carrier onto another carrier which has previously been discharged onto conveyor 10, stopping members $P_{b3}$ and $P_{c3}$ are projected above conveyer 10 to prevent carriers upstream of the respective assembly stations 12 and 13 from being transferred by conveyer 10 to positions adjacent assembly stations 12 and 13 at which the assembled carriers therefrom are to be discharged. Further, at assembly stations 12 and 13, stopping members $P_{b4}$ and $P_{c4}$ are projected above conveyer 9 so as to clamp the carriers waiting to be supplied to the assembly stations, at both the front and back of the carrier, that is, between stopping members $P_{b1}$ and $P_{b4}$ and between stopping members $P_{c1}$ and $P_{c4}$. In this manner, the carriers at such positions can be picked up from conveyer 9 by the respective carrier loaders 34 without any misalignment therebetween. It is to be appreciated that various combinations of the serial and parallel operations described above may be performed with the automatic assembling apparatus according to this invention.

It is to be appreciated that the automatic assembling apparatus according to this invention has a high rate of operation, that is, feeding and discharging of carriers 1 to the respective assembly stations can be performed almost simultaneously. In addition, the automatic assembling apparatus according to this invention provides flexibility for changes in design of the products.

Having described a specific preferred embodiment of the invention, it is to be understood that the present invention is not limited to that precise embodiment, and that various changes and modifications may be effected therein by one skilled in the art without departing from the scope or spirit of the invention, as defined in the appended claims herein.

What is claimed is:

1. An automatic assembling apparatus comprising:
   first and second parallel conveyer means for each independently transferring at least one carrier means in a first direction;
   assembly station means located alongside said conveyer means and including movable table means and work means by which various assembling operations are performed with respect to said at least one carrier means while the latter is on said table means; and
   carrier loading means movable between a first position in opposing relation to said movable table means and a second position in opposing relation to said conveyer means, said carrier loading means including first and second chucking means in opposing relation to said first and second parallel conveyer means, respectively, when said carrier loading means is at the second position for each slelectively picking up and releasing said at least one carrier means on the respective conveyer means and in opposing relation to said movable table means of the respective assembly station means when said carrier loading means is at the first position for each selectively picking up and releasing said at least one carrier means on said movable table means.

2. An automatic assembling apparatus according to claim 1; in which said assembly station means includes shift table means positioned on said movable table means and movable relative to the latter between first and second positions in opposing relation to said first and second chucking means, respectively, when said carrier loading means is at the first position of the latter.

3. An automatic assembling apparatus according to claim 1; in which said first and second chuck means of said carrier loading means are operable independently of each other for simultaneously picking up and releasing carrier means on said parallel conveyer means, respectively, when said carrier loading means is at said second position, and for picking up and releasing carrier means with respect to said movable table means when said carrier loading means is at said first position.

4. An automatic assembling apparatus according to claim 1; further including stopping means for preventing movement of said at least one carrier means on said first and second parallel conveyer means with respect to said assembly station means in accordance with predetermined operations to be performed; and sensing means for detecting the presence of said at least one carrier means on said first and second parallel conveyer means and for controlling said stopping means in response thereto.

5. An automatic assembling apparatus according to claim 4; in which said assembly station means includes a plurality of assembly stations for performing said assembling operations; and said stopping means includes a plurality of stopping members associated with respective ones of said plurality of assembly stations for selectively stopping said at least one carrier means adjacent respective ones of said assembly stations.

6. An automatic assembling apparatus according to claim 5; in which each of said first and second conveyor means is comprised of a plurality of roller elements, at least some of said roller elements being spaced from each other, and said stopping members are adapted to project from between adjacent spaced roller elements for selectively stopping said at least one carrier means adjacent respective ones of said assembly stations.

7. An automatic assembling apparatus according to claim 5; in which said sensing means controls at least one of said stopping members so that said at least one carrier means is supplied to said plurality of assembly stations in a serial operation.

8. An automatic assembling apparatus according to claim 5; in which said sensing means controls at least one of said stopping members so that said at least one carrier means is supplied to said plurality of assembly stations in a parallel operation.

9. An automatic assembling apparatus according to claim 1; in which each of said chucking means includes pawl means for gripping said at least one carrier means on one of said movable table means and said first and second parallel conveyor means, slide cam means, pivot lever means for controlling said pawl means to grip said at least one carrier means in response to said slide cam means, and lift means for raising said pawl means in response to said slide cam means.

10. An automatic assembling apparatus according to claim 9; in which said slide cam means is adapted to move between a first position and a second position, said pivot lever means and said lift means are biased into engagement with said slide cam means during at least a part of said movement of said slide cam means between said first position and said second position, and said lift means raises said pawl means in response to said movement of said cam means and said pivot lever means controls said pawl means to grip said at least one carrier means in response to said movement of said slide cam means.

* * * * *